(12) United States Patent
Kaneko et al.

(10) Patent No.: US 6,234,930 B1
(45) Date of Patent: May 22, 2001

(54) TRANSMISSION AND VEHICLE USING SAME

(75) Inventors: Satoru Kaneko, Urizura-machi; Yutaka Matsunobu, Hitachinaka; Ryoso Masaki, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/485,152

(22) PCT Filed: Nov. 30, 1998

(86) PCT No.: PCT/JP98/05377

§ 371 Date: Feb. 4, 2000

§ 102(e) Date: Feb. 4, 2000

(87) PCT Pub. No.: WO99/55551

PCT Pub. Date: Nov. 4, 1999

(30) Foreign Application Priority Data

Apr. 28, 1998 (JP) .................................................. 10-118169

(51) Int. Cl.[7] ...................................................... F16H 3/72
(52) U.S. Cl. .............................. 475/5; 475/2; 477/4; 477/5
(58) Field of Search ................................ 475/5, 2; 477/2, 477/3, 4, 5

(56) References Cited

U.S. PATENT DOCUMENTS

| | | | |
|---|---|---|---|
| 3,757,912 | * 9/1973 | Ball et al. ................................ 477/5 |
| 5,211,610 | * 5/1993 | Hurth ................................... 475/2 X |
| 5,558,589 | * 9/1996 | Schmidt ..................................... 475/5 |
| 5,558,595 | * 9/1996 | Schmidt et al. ......................... 477/3 |
| 5,904,631 | * 5/1999 | Morisawa et al. ....................... 475/5 |
| 5,931,757 | * 8/1999 | Schmidt ..................................... 475/2 |
| 5,947,855 | * 9/1999 | Weiss ....................................... 475/5 |
| 6,053,833 | * 4/2000 | Masaki ..................................... 475/2 |

FOREIGN PATENT DOCUMENTS

0047054  *  3/1982  (JP) .......................................... 475/5

* cited by examiner

Primary Examiner—Charles A Marmor
Assistant Examiner—Ha Ho
(74) Attorney, Agent, or Firm—Evenson, McKeown, Edwards & Lenahan, P.L.L.C.

(57) ABSTRACT

A vehicle provided with an engine 1 which generates a driving energy for the vehicle, planetary gears 4 and 6 comprising sun gears, planet gears and ring gears, motors 8 and 9 for respectively controlling the sun gears, and a clutch 14, the planet gears being connected to an input shaft driven by the engine and the ring gears connected to an output shaft for driving wheels, wherein gear ratios from the input shafts to the output shafts in the planetary gears 4 and 6 are set at a value different to each other. A stepless speed changing function which permits vehicular operation in a high engine efficiency region while minimizing an electrical energy loss is realized by a small-sized transmission using small-sized motors. The vehicle, which uses the transmission, can be operated in a high engine efficiency region while keeping an electrical energy loss to a minimum.

12 Claims, 10 Drawing Sheets

TRANSMISSION AND VEHICLE USING SAME

TECHNICAL FIELD

The present invention relates to a transmission comprising motors and differential mechanisms, as well as a vehicle using the same.

BACKGROUND ART

As a drive system capable of reducing the fuel consumption of an engine there is known a hybrid vehicle which utilizes a motor drive force.

Various types of hybrid vehicles such as series type and parallel type have been proposed, among which is included a series-parallel hybrid type using two motors and one planetary gear. For example, in Japanese Patent Laid-open No. Hei 7-135701 there is disclosed a method wherein a driving force of an engine is inputted to a planetary gear and control is made by a generator so that a vehicle is driven with a driving force obtained from an output shaft of the planetary gear. While a part of energy of the engine is generated by a generator, a driving force is assisted from a motor connected to the output shaft to drive the engine always in a high torque region of a high efficiency, and at the same time a speed change function can be attained.

The same principle as above is also described in Japanese Patent Laid-open Nos. Sho 49-112067 and Sho 58-191364.

According to the methods disclosed therein, power is generated by a generator and a driving force is obtained by a motor for realizing a speed change function, so that there occurs an electrical energy loss. Consequently, there occurs reduction in efficiency by an amount corresponding to the electrical energy loss with respect to the whole of the vehicle concerned despite the engine can be driven always at a highly efficient operating point.

The present invention has been accomplished in view of the above-mentioned problems and it is the first object of the invention to provide a small-sized transmission constituted by small-sized motors, thereby realizing a stepless speed change function which permits vehicular operation in a region of a high engine efficiency while minimizing an electrical energy loss.

It is the second object of the present invention to provide a vehicle capable of being driven in a region of a high engine efficiency while minimizing an electrical energy loss.

DISCLOSURE OF THE INVENTION

The above first object of the present invention is achieved by a transmission having a plurality of differential mechanisms in which motors control a difference in the number of revolutions between an input shaft and an output shaft thereof, the input and output shafts for the plural differential mechanisms being used in common, wherein gear ratios from the input shafts to the output shafts in the plural differential mechanisms are set at a value different to each other, and gear ratios from the input shafts to the motors in the plural differential mechanisms are set at a value different to each other.

Particularly, this construction is effective in reducing the size of the motor which controls the differential mechanism smaller in the gear ratio from the input shafts to the output shafts.

The above first object is achieved also by a transmission having a plurality of differential mechanisms in which motor shafts driven by motors control a difference in the number of revolutions between an input shaft and an output shaft thereof, the input and output shafts for the plural differential mechanisms being used in common, wherein gear ratios from the input shafts to the output shafts in the plural differential mechanisms are set at a value different to each other, the transmission further having a locking/unlocking mechanism for locking and unlocking the motor shaft in at least the differential mechanism larger in the gear ratio of the plural differential mechanisms.

According to this construction it is possible to reduce the size of the motor disposed on the side where the locking/unlocking mechanism is provided. Thus, by using both means described above in combination it is made possible to provide a transmission still smaller in size.

The above second object of the present invention is achieved by a vehicle having an engine which generates a driving energy for driving the vehicle and a transmission which changes the rotational speed of the engine and transmits a driving force to wheels, the transmission having at least first and second differential mechanisms which input the driving force from the engine and output a driving force for the wheels, and also having first and second motors for controlling the first and second differential mechanisms, respectively, wherein gear ratios from input shafts to output shafts in the first and second differential mechanisms are set at a value different to each other and gear ratios from the input shafts to the first and second motors are set at a value different to each other.

The above second object of the present invention is achieved also by a vehicle having an engine which generates a driving energy for driving the vehicle and a transmission which changes the rotational speed of the engine and transmits a driving force to wheels, the transmission having at least first and second differential mechanisms which input the driving force from the engine and output a driving force for the wheels, and also having first and second motors for controlling the first and second differential mechanisms, respectively, wherein a gear ratio from an input shaft to an output shaft in the first differential mechanism is set at a value larger than a gear ratio from an input shaft to an output shaft in the second differential mechanism, the transmission further having a locking/unlocking mechanism for locking and unlocking a motor shaft which transmits the driving force of at least the first motor to the first differential mechanism.

BRIEF DESCRIPTION THE DRAWINGS

Figure 1:
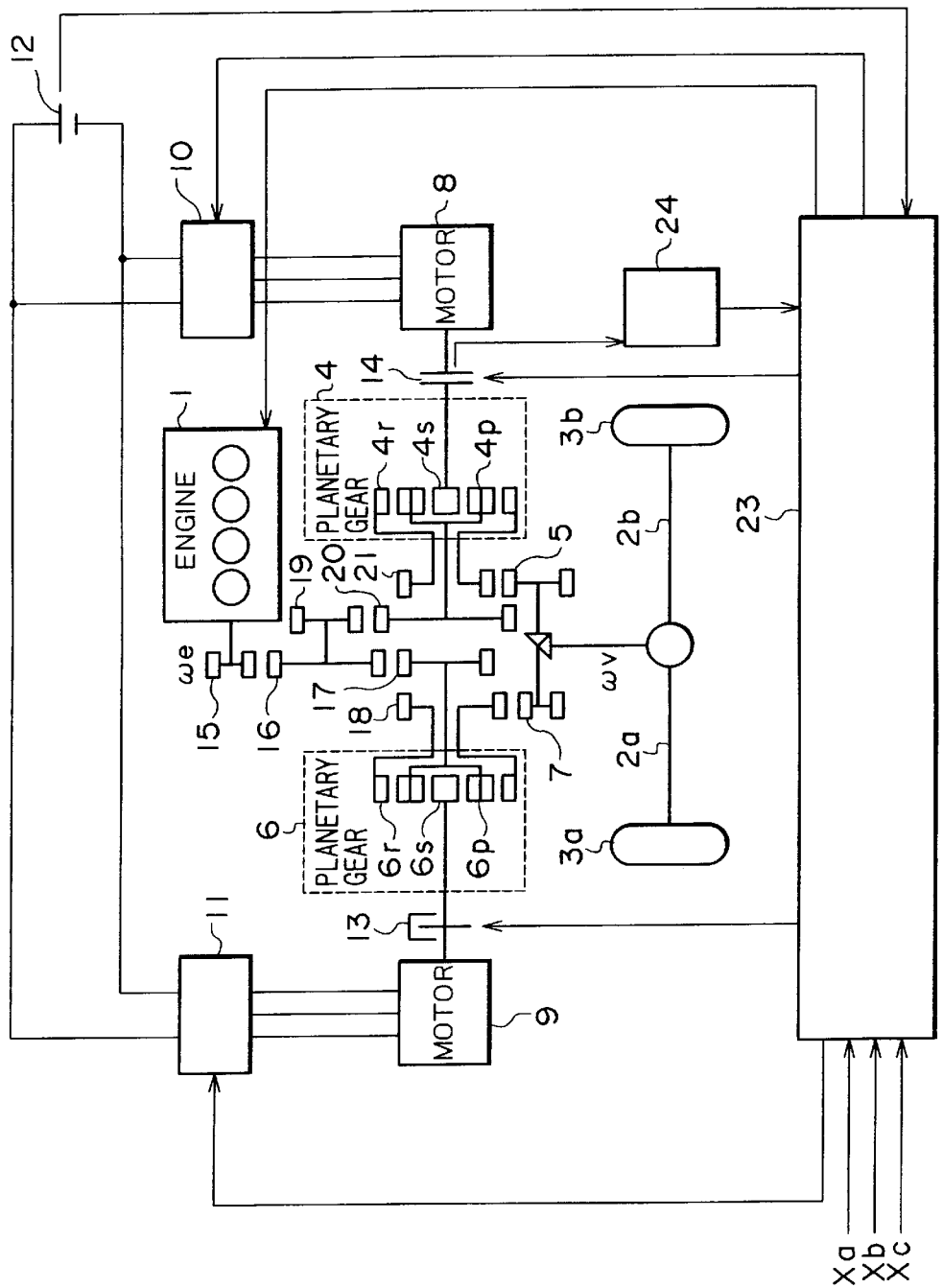
FIG. 1 is a construction diagram of a hybrid vehicle according to an embodiment of the present invention which realizes a speed change function with use of two planetary gears whose sun gears are controlled by motors.
Figure 3A:
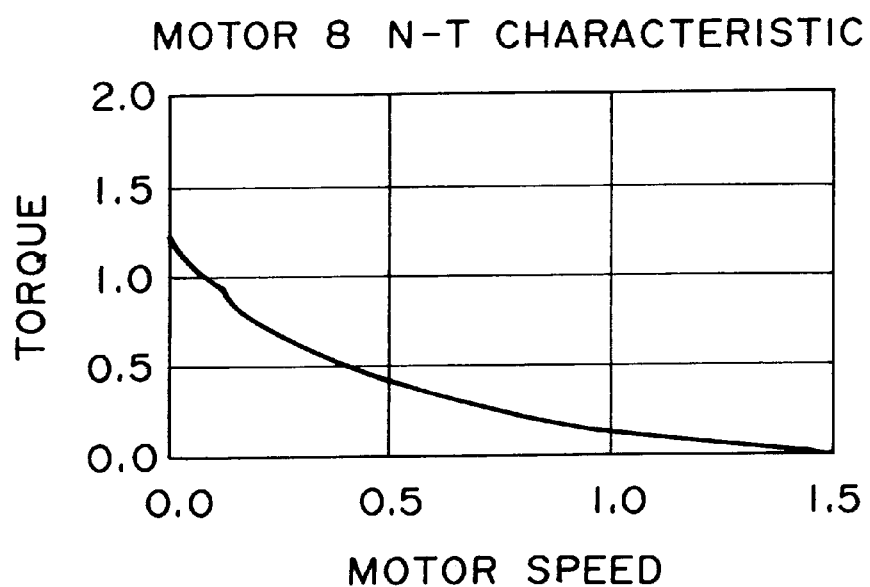
Figure 3B:
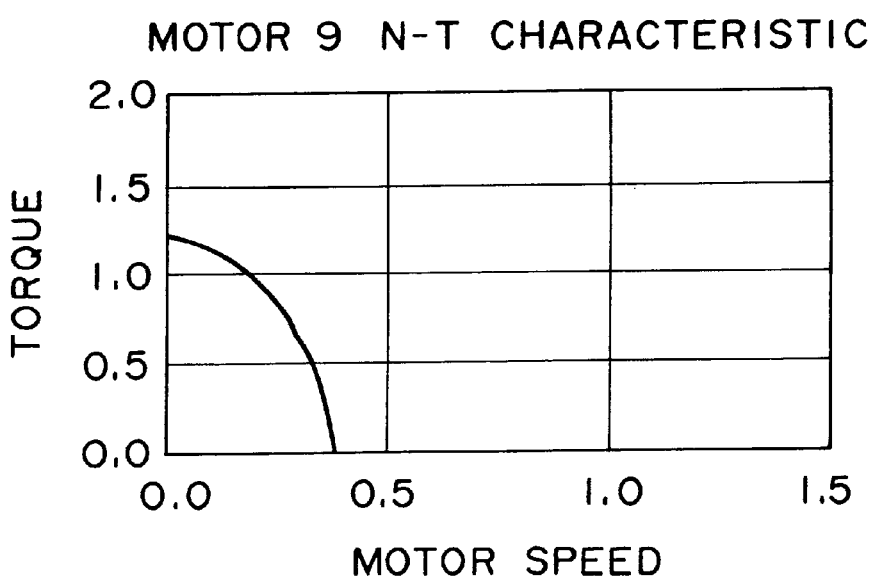

FIGS. 3A and 3B are speed-torque characteristic diagrams of motors 8 and 9 with a clutch 14 omitted in FIG. 1 and with the same gear ratio on an input side.

Figure 4:
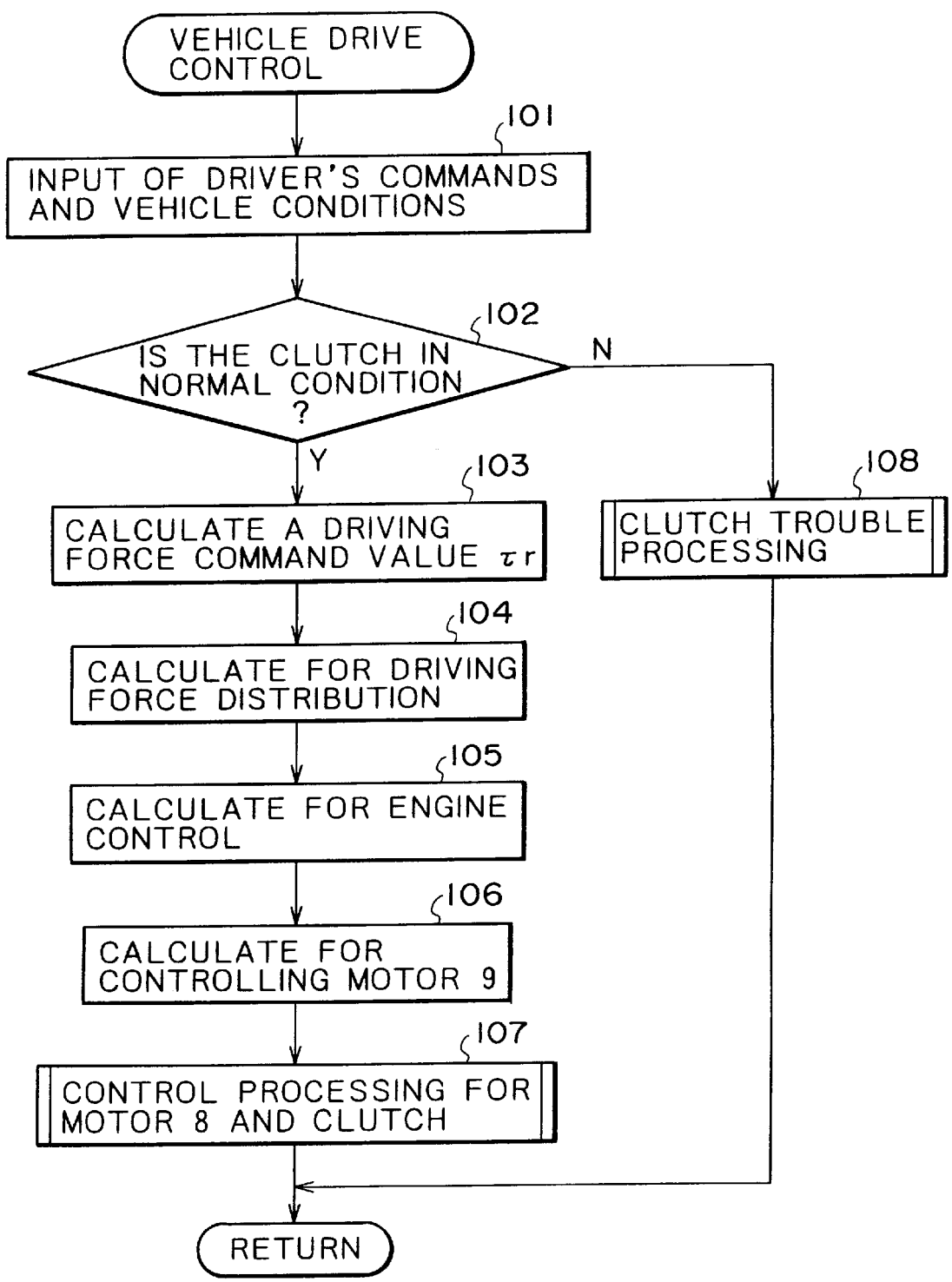

FIG. 4 is a control flowchart for the hybrid vehicle shown in FIG. 1.

Figure 5:
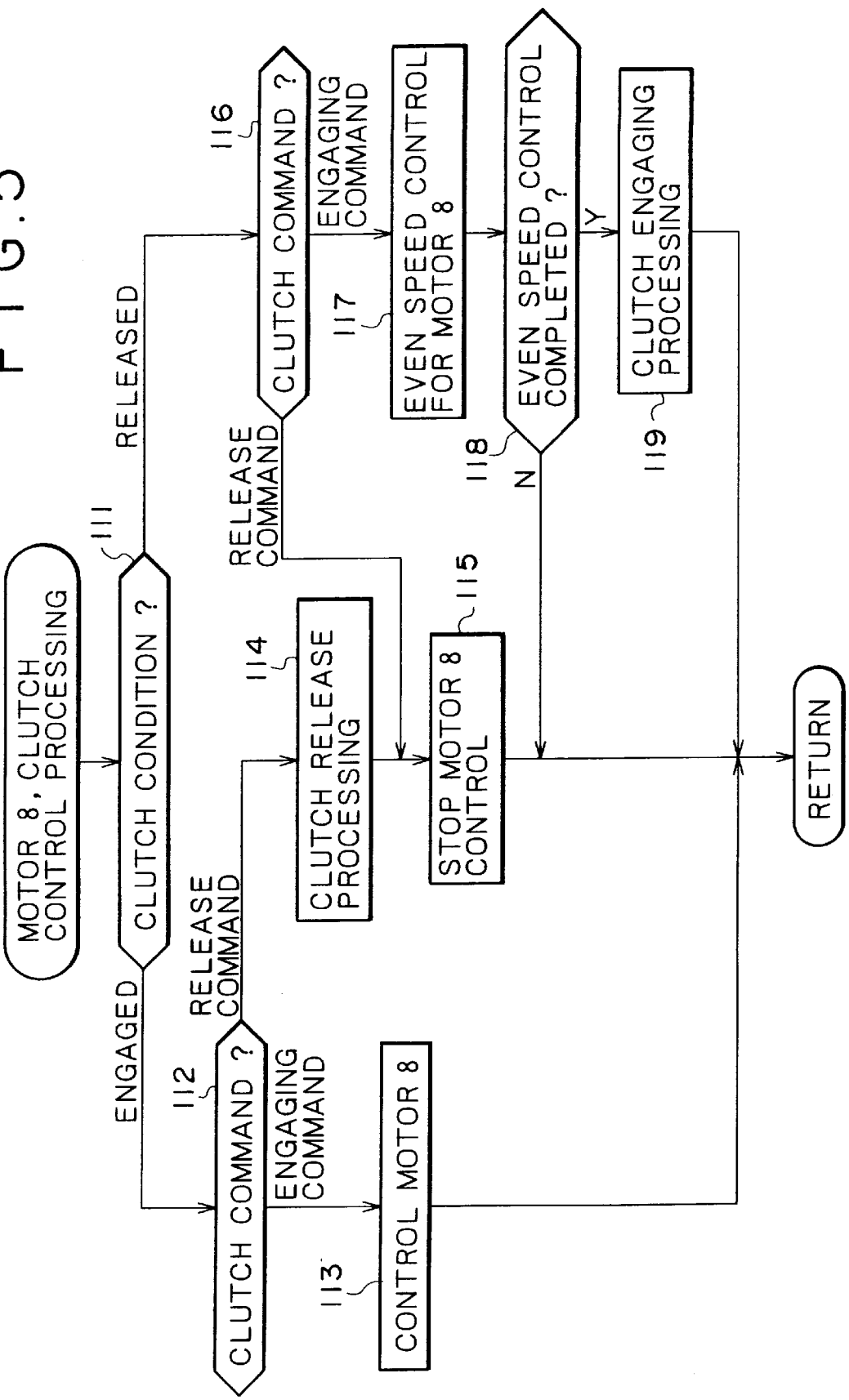

FIG. 5 is a control flowchart for the motor 8 and clutch 14 shown in FIG. 4.

Figure 6:
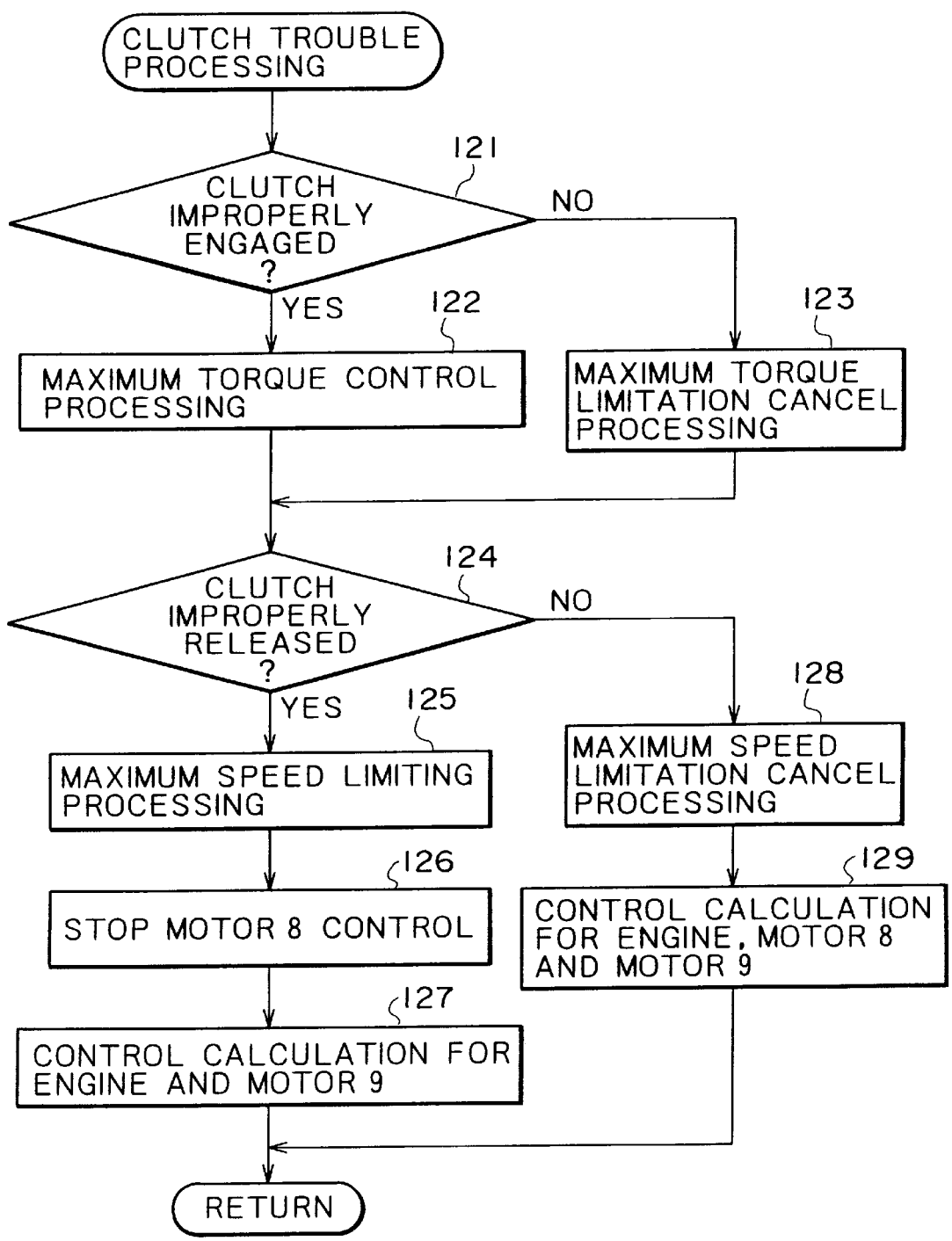

FIG. 6 is a processing flowchart with a trouble occurring in the clutch 14 shown in FIG. 4.

Figure 7:
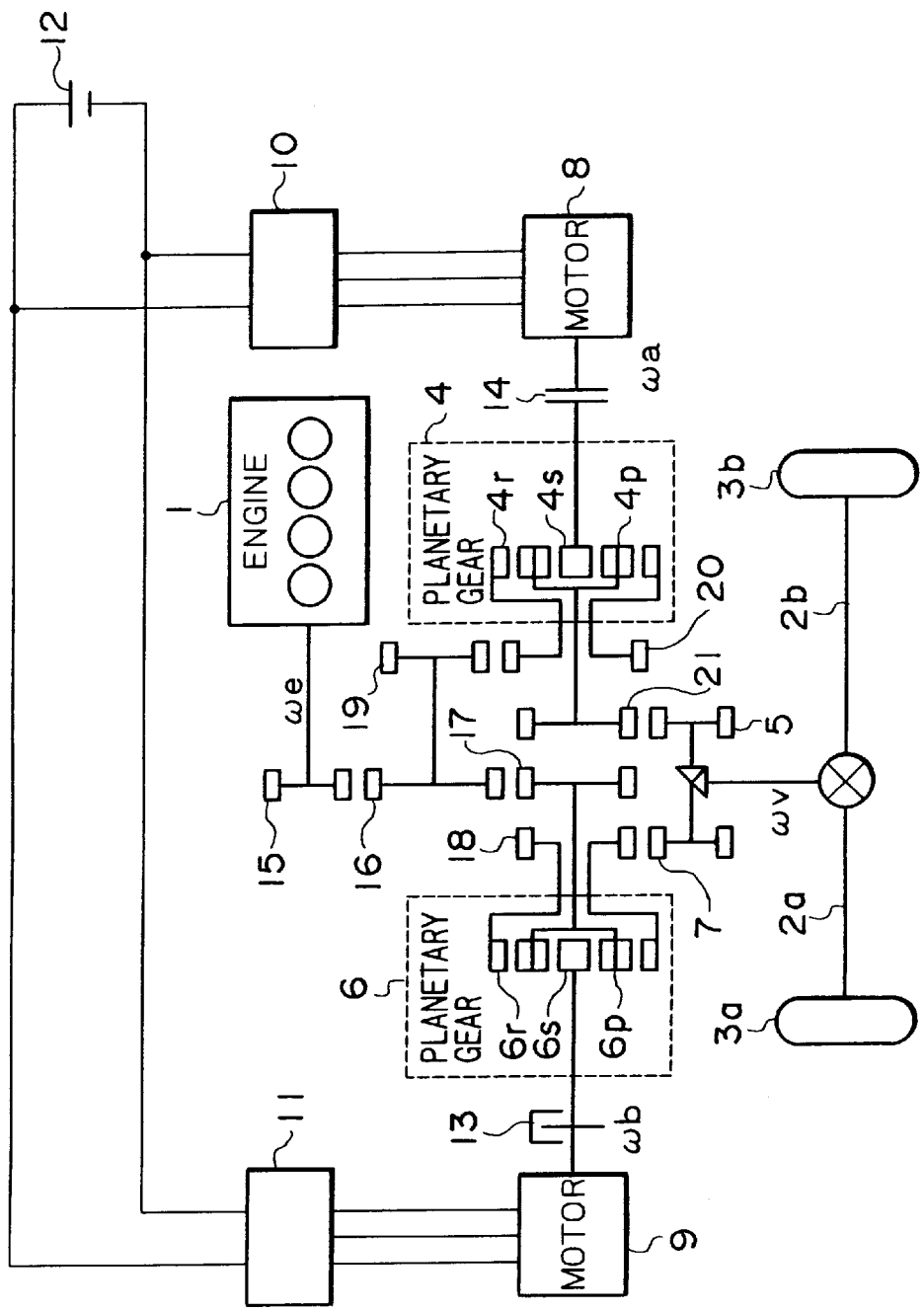

FIG. 7 is a construction diagram of a hybrid vehicle according to another embodiment of the present invention wherein input and output gears of a planetary gear 4 are constructed in a manner different from that in FIG. 1.

Figure 8:
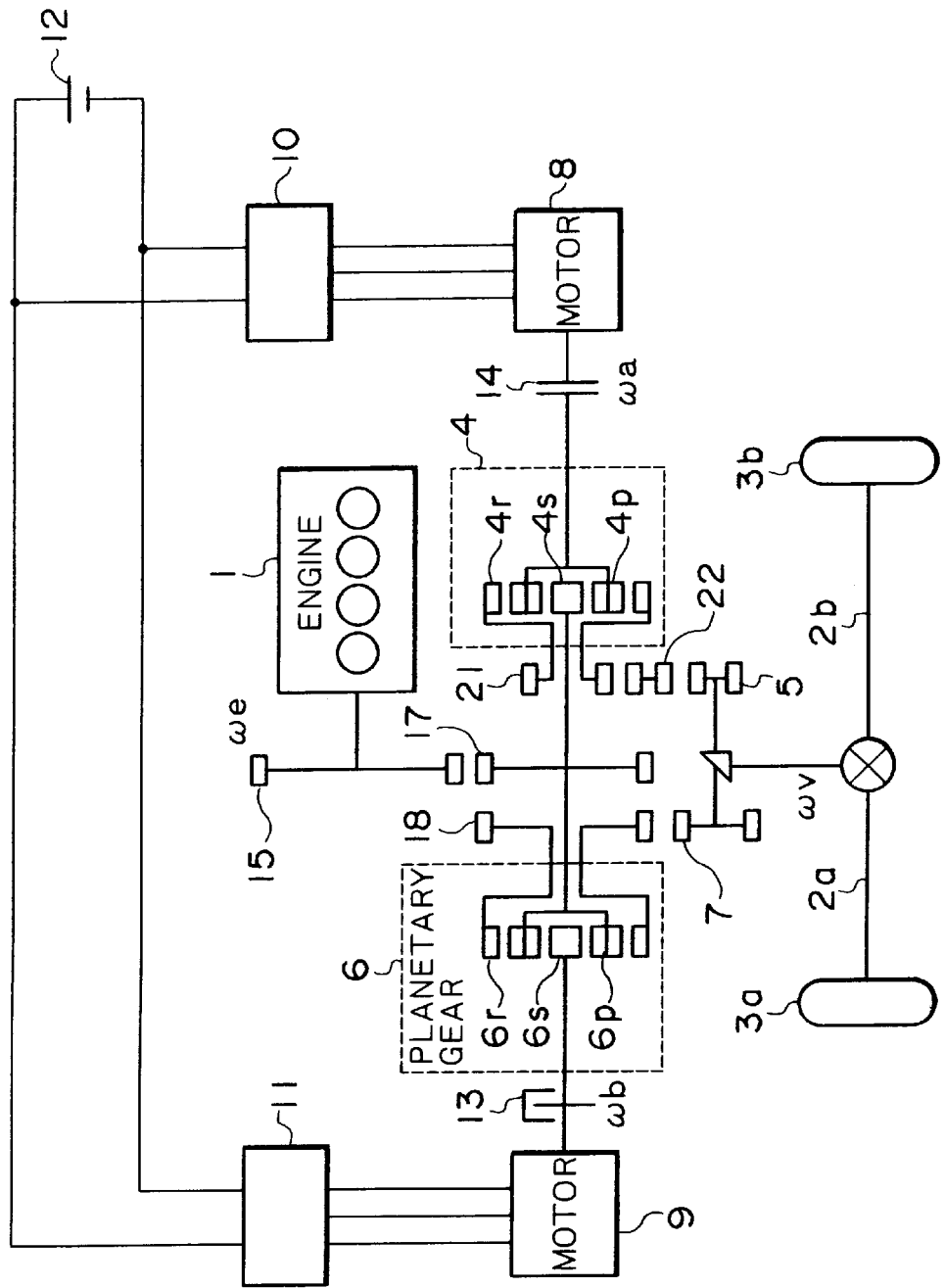

FIG. 8 is a construction diagram of a hybrid vehicle according to a further embodiment of the present invention wherein a sun gear 4s is used on an input side of a planetary gear 4.

Figure 9:
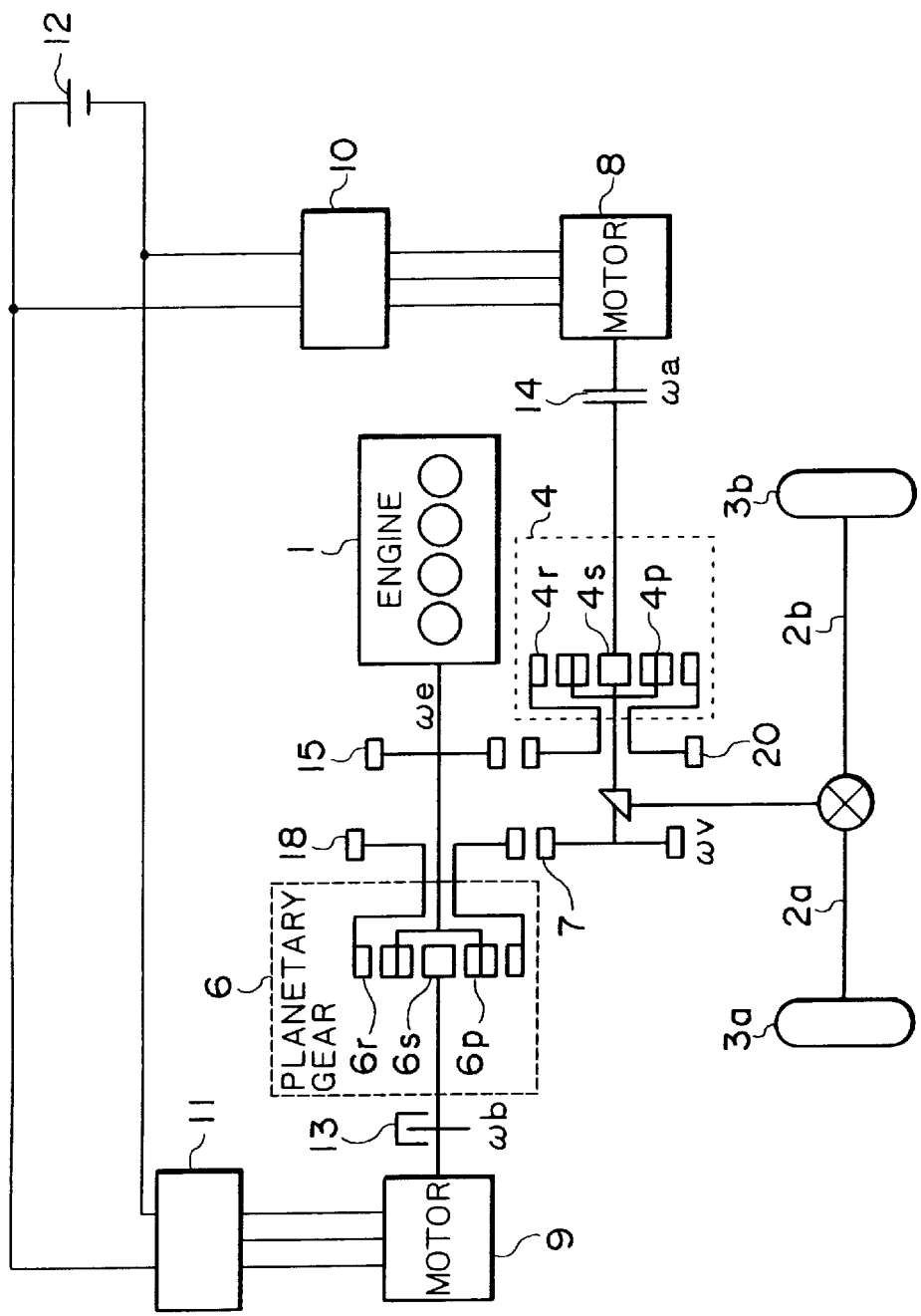

FIG. 9 is a construction diagram of a hybrid vehicle according to a still further embodiment of the present invention wherein the number of constituent gears is decreased.

Figure 10:
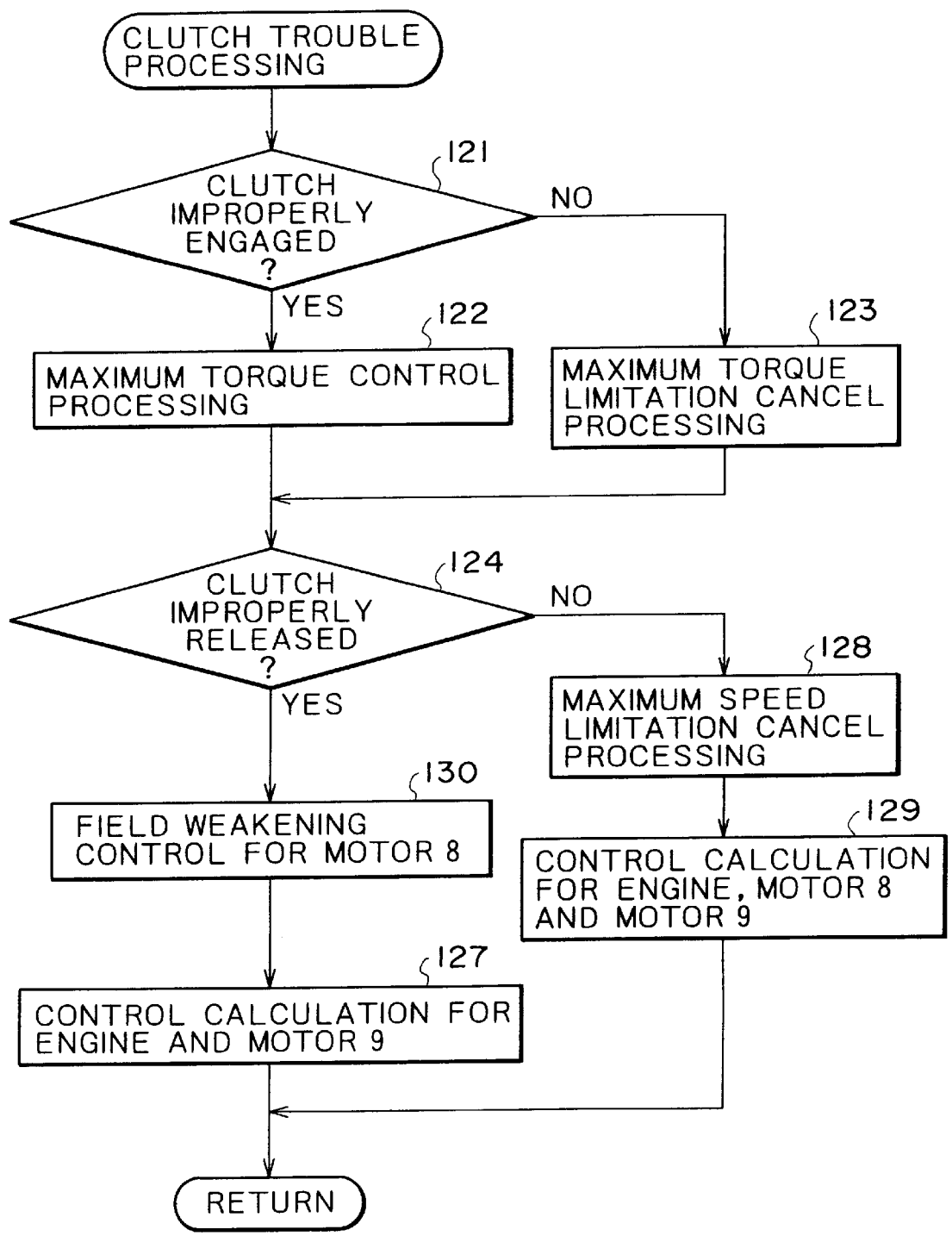

FIG. 10 is a processing flowchart showing a further embodiment of the control processing illustrated in FIG. 4.

BEST MODE FOR CARRYING OUT THE INVENTION

An embodiment of the present invention will be described below with reference to FIG. 1.

FIG. 1 illustrates an automobile wherein, with use of energy of an engine 1, tires 3a and 3b are rotated through drive shafts 2a and 2b to drive a body of the automobile. Planetary gears 4 and 6, which are important components in the present invention, respectively comprise sun gears 4s and 6s, planetary gears 4p and 6p, and ring gears 4r and 6r. The sun gears 4s and 6s are driven respectively by motors 8 and 9 which are controlled by power converters 10 and 11, respectively. As a motor for an automobile, a permanent magnet synchronous motor is most suitable from the standpoint of attaining a high efficiency and a small size. A battery 12 is used for the supply of energy required by the motors 8 and 9 and for the storage of energy generated by the motors. Rotation of the engine 1 is transmitted to the planet gear 6p of the planetary gear 6 via gears 15, 16 and 17 and is also transmitted to the planet gear 4p of the planetary gear 4 via gears 19 and 20 which are connected to the gears 16. Thus, the driving torque of the engine 1 is distributed to the planetary gears 4 and 6 by the construction from the gear 15 to the gear 20. What is important in the present invention is that a gear ratio from the gear 15 to the gear 17 and that from the gear 15 to the gear 20 are different from each other. As to the operation concerned, the details thereof will be described later.

Also as to the ring gears, gears different in gear ratio are disposed on the output side. A gear 21 is connected to the ring gear 4r to rotate a gear 5, while a gear 18 is connected to the ring gear 6r to rotate a gear 7. The gears 5 and 7 are clamped to each other and the tires 3a and 3b are driven with a torque transmitted from both gears. A gear ratio from the gear 15 located on the input side to the gear 5 on the output side via the planetary gear 4, which gear ratio means the ratio of a rotation cycle of the gear 5 to that of the gear 15 in a locked state of the sun gear 4s and will hereinafter be referred to as gear ratio L, is set at a value larger than a gear ratio (gear ratio H hereinafter) from the gear 15 to the gear 7 via the planetary gear 6. Generally, it is desirable to set the gear ratio L at a value three to six times as large as the gear ratio H. Particularly when the transmission of the invention is applied to an automobile, it is desirable to set the gear ratio L at a value four to five times as large as the gear ratio H, which value is advantageous to the improvement of the vehicular driving performance and the reduction in size of the transmission.

A description will now be given of one method for driving the vehicle with use of a controller 23 shown in FIG. 1. The control unit 23 makes control so that when the vehicle is driven at a low speed and a low torque, the clutch 14 is engaged and a locking/unlocking device 13 is released, thereby permitting the vehicle to be driven with a torque of the motors 8 and 9. By a cooperative speed control with both motors 8 and 9 the vehicle is driven while keeping the engine speed ωe zero. When the driver presses down on an accelerator to accelerate the vehicle, the engine 1 is rotated up to a startable speed and is started by a cooperative speed control of both motors 8 and 9 so as to permit a high-torque drive. After start-up of the engine 1, the motor 9 is brought into a free running condition, while the motor 8 is locked electrically. As a result, the vehicle comes to be driven at the gear ratio L from the gear 15 to the gear 5 and therefore a driving force of high speed and high torque can be generated in the tires 3a and 3b. This speed change ratio can be regarded as being equal to that of a low gear in a manual transmission.

When the vehicle is to be driven by the engine 1 while running at a medium or higher speed, the motor 8 is brought into a free running condition electrically, while the motor 9 is locked electrically and is thereafter locked mechanically by the locking/unlocking device 13. As a result, the vehicle is driven at the gear ratio H from the gear 15 to the gear 7. Therefore, the engine 1 operates in a low speed, high torque region and a change in speed is made to a high speed side by the transmission to drive the vehicle. In this steady state the engine 1 operates in a high efficiency region of a high torque. Besides, since the electrical energy is not utilized by the motors 8 and 9, there is no electrical loss and the vehicular running distance can be made longer at a low fuel consumption. When the vehicle is to be accelerated while running at a medium or higher speed, the motor 8 is brought into a driving condition and the motor 9 into a driving or power generating condition to attain the same function as in a continuously variable transmission or there can be attained a function of adding motor assisting torque to the engine drive force as in a hybrid automobile.

In the case where the vehicle speed exceeds a predetermined speed in a high-speed running, a control is made to release the clutch 14. If the motor 9 is locked, the motor 8 will be rotated at a high speed, which is therefore prevented by releasing the clutch 14. If a permanent magnet synchronous motor suitable for an automobile is used as the motor 8, an excessive counter electromotive force is generated by a high-speed rotation. Since an excessive counter electromotive force will result in destruction of the power converters, so it is necessary to make a design while paying attention to this point. In designing a motor so as to prevent the generation of an excessive counter electromotive force there is adopted a method wherein the number of turns of winding is made small, while an electric current to be passed through the winding is enhanced to ensure a required torque. By adopting such a high-speed rotation preventing construction as in this embodiment it is possible to make a motor design with a larger number of turns of winding. Thus, in this embodiment it is possible to make the electric current flowing in the motor 8 small and therefore it is possible to attain the reduction in size of the motor 8 and in capacity of the power converter 10 from the standpoint of a thermal design.

Setting the gear ratio from the gear 15 to the gear 17 smaller than the gear ratio from the gear 15 to the gear 20 is advantageous in carrying out the above operations. This point will now be described. The gear ratio L from the gear 15 to the gear 5 is set several times larger than the gear ratio H from the gear 15 to the gear 7. Besides, the gears 5 and 7 are coupled together through a common shaft.

If both gear ratios are set at the same value, the motor 9 comes to operate in a narrow speed range relative to the speed range of the motor 8. In view of this point, if the gear ratio from the gear 15 to the gear 17 is set smaller than the gear ratio from the gear 15 to the gear 20, the maximum operating speed of the motor 9 becomes high, so that the maximum torque of the motor 9 can be kept small and thus the size of the motor 9 can be reduced by changing the gear ratios. Since in this embodiment the gear ratio from the planet gear 4p in the planetary gear 4 to the motor 8 and the gear ratio from the planet gear 6p in the planetary gear 6 to the motor 9 are the same, the above description covered only the components up to the input portions of the planetary gears.

Figure 2A:
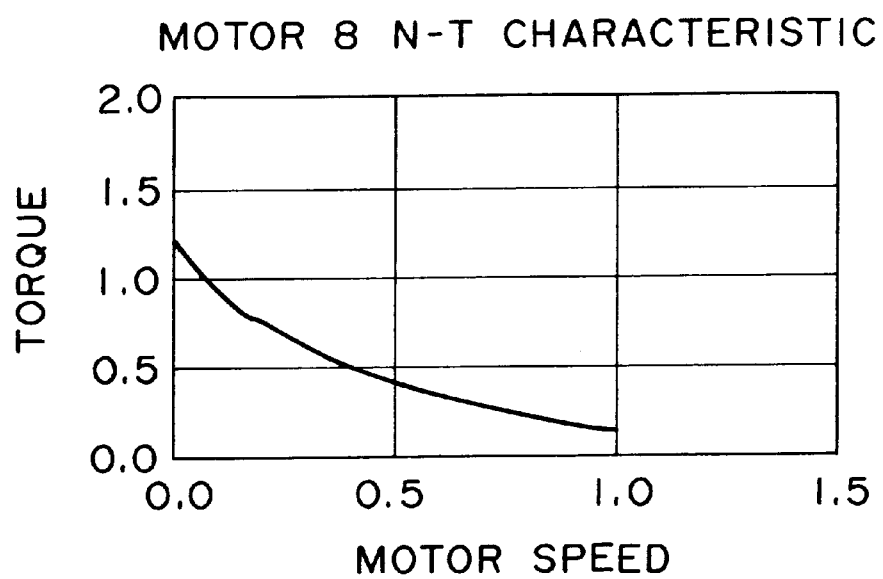
FIGS. 2A and 2B are speed-torque characteristic diagrams of motors 8 and 9 shown in FIG. 1.
Figure 2B:
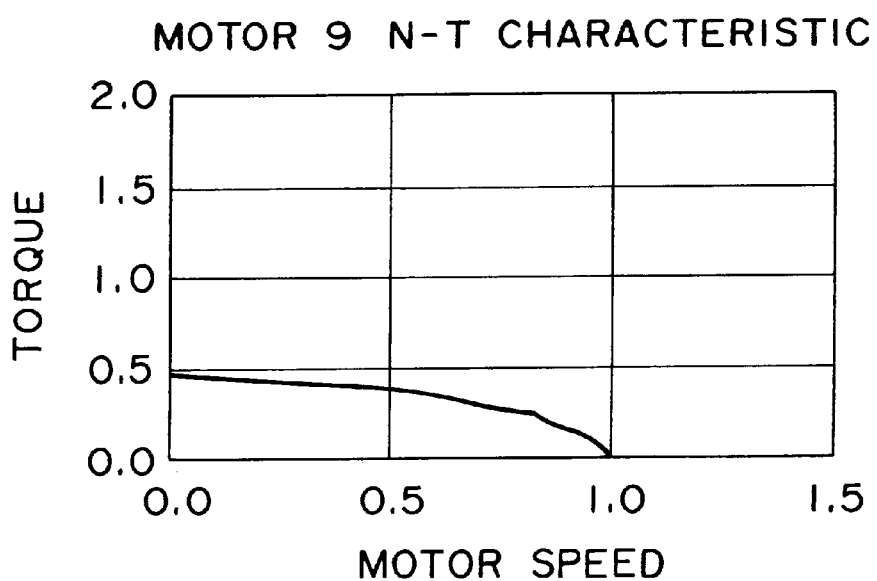

FIGS. 2A and 2B show speed-torque characteristics (N-T characteristics) of the motors 8 and 9 both used in the embodiment of FIG. 1. For comparison, FIGS. 3A and 3B show speed-torque characteristics of both motors obtained without using the clutch 14 in FIG. 1 and with the gear ratio from the gear 15 to the gear 17 and that from the gear 15 to the gear 20 set equal to each other. With the clutch 14, the motor 8 exhibits such a characteristic as shown in FIG. 2A in which a high speed region is cut in comparison with FIG. 3A, thus permitting a motor design so as to increase the number of turns of winding and decrease the motor current, whereby the motor 8 and the power converter 10 can be reduced in size. In comparison with the characteristic shown in FIG. 3B, the characteristic shown in FIG. 2B indicates that the maximum torque of the motor 9 can be diminished. This is effective in reducing the size of the motor 9. As a matter of course, that the maximum torque of the motor 9 can be made small leads to a decrease of the motor current, thus permitting the reduction in size of the power converter 11.

FIG. 4 is a flowchart showing a control method for the system of FIG. 1 in which the control is made by the control unit 23. In step 101 in FIG. 4, the control unit 23 inputs operation commands intended by the vehicular driver such as an accelerator depression quantity Xa, a brake depression quantity Xb, and a change-over signal Xc which instructs forward, reverse, or neutral, as well as vehicular conditions such as vehicle velocity ωv, charging condition of the battery 12, and temperatures of various components. In step 102, the control unit 23 judges whether the clutch 14 is in normal condition or not on the basis of a signal provided from a failure detector 24 shown in FIG. 1. If the answer is affirmative, there are performed normal control operations from step 103 to step 107, while if the answer is negative, a clutch trouble processing is executed in step 108. As to the contents of the processing performed in step 108, it will be described later with reference to FIG. 6.

When the clutch 14 is judged to be normal, processings are performed successively from step 103. In step 103, a vehicular driving force command value τr is calculated on the basis of information values indicative of vehicle conditions and operation commands which were inputted in step 101. Next, in step 104, a decision is made as to in what manner the driving forces of the engine 1 and motors 8, 9 are to be distributed, including which of opening and closing commands for the clutch 14 is to be issued, on the basis of the vehicular driving force command value τr and the vehicle velocity τv. As a result there are determined drive command values (torque or speed command values). In step 105, an engine control calculation is conducted on the basis of a driving force command value for the engine 1 and the engine is controlled to satisfy the driving force command value. In step 106, a motor control calculation is conducted on the basis of a driving force command value for the motor 9 and a predetermined driving force is generated. Further, in step 107, a control is made to satisfy a driving force command value for the motor 8. In this case, it is necessary that the processing should include the control for the clutch 14, and the details of this processing are shown in FIG. 5. As noted in the previous operational description in connection with FIG. 1, it is when the vehicle speed exceeds a predetermined value that the clutch should be released. Even if the clutch is released when the motor rotating speed exceeds a predetermined value, instead of using the vehicle speed, there will be obtained an equivalent effect. Even when the torque command value of the motor 8 is zero, if a command for releasing the clutch 14 is given, it is possible to diminish a mechanical loss caused by follow-up rotation of the motor.

In FIG. 5, the present state of the clutch 14 is judged in step 111, and if the clutch is engaged, the processing of step 112 is performed, while if the clutch is released, the processing of step 116 is conducted. In step 112, if a command issued for the clutch 14 is an engaging command, it suffices for the clutch to be kept engaged, so a control processing is performed to give a driving force command for the motor 8 in step 113. If the command for the clutch 14 is a release command in step 112, a processing for releasing the clutch is carried out in step 114. Next, in step 115 the control for the motor 8 is stopped since the clutch 14 is released.

If the present state of the clutch 14 is a released state, a shift is made from step 111 to step 116, in which a judgment is made about a command value for the clutch 14. If the command is a clutch release command, a processing is performed to stop the control for the motor 8 in step 115 because it suffices for the clutch 14 to be kept released. If the clutch command is an engaging command in step 116, an even speed control is made for the motor 8 in step 117 so that the rotational speed of the motor 8 is made coincident with that of the sun gear 4s. Next, in step 118 there is made judgment as to whether the speed control has been completed or not in step 118, and only when the speed control has been completed, a processing for engaging the clutch 14 is performed in step 119. The driving force from the motor 8 is controlled by performing the above processings.

The clutch trouble processing method shown in FIG. 4 will now be described with reference to the flowchart of FIG. 6. In step 121 it is determined whether the clutch 14 is improperly engaged or not. If the clutch is found to be improperly engaged, a processing is made in step 122 to limit a maximum torque capable of being generated by the vehicle. The maximum torque is transferred from the engine 1 and the motor 8 via the planetary gear 4, but in the case where the clutch 14 cannot be engaged, the torque generated from the engine 1 and the motor 9 is transferred via the planetary gear 6 alone and serves as a driving torque for driving the vehicle. Thus, a limitation is made on the maximum torque capable of being generated from gear ratio setting conditions. Therefore, it is notified to the vehicle driver that the maximum torque is limited, and at the same time a processing is performed to also limit the torque command value. If the clutch 14 is properly engaged, a processing is made in step 123 to cancel the limitation on the maximum torque.

Next, in step 124 it is judged whether the clutch 14 is improperly released or not, and if the clutch is improperly released, there are performed processings from step 125 to step 127. In step 125 a processing is made to limit the maximum vehicle speed. It is assumed that the limited maximum speed is not higher than the vehicle speed obtained when the motor speed shown in FIG. 2A exceeds 1. Next, in step 126, the control for the motor 8 is stopped, and in step 127 a control for the engine 1 and the motor 9 is executed within limited speed range and torque range. By performing such processings the power converter 10 can be prevented from being damaged by a counter electromotive force at a high-speed rotation in an improperly released condition of the clutch 14. On the other hand, if it is judged in step 124 that the clutch 14 is properly released, the limitation on the maximum speed is cancelled in step 128, then in step 129 a control for the engine 1 and motors 8, 9 is made in a limited state of the maximum torque.

Thus, according to this embodiment it is possible to provide a transmission of small size and low cost possessing a stepless speed changing function and a motor assisting function. Besides, this transmission is applicable not only to ordinary types of automobiles but also to hybrid automobiles. Although the method adopted in this embodiment is limiting the maximum vehicle speed, the same effect as above can also be obtained even by adopting a method of limiting the maximum engine speed.

FIG. 7 illustrates another embodiment of the present invention which is different from the embodiment shown in FIG. 1 in point of how to construct gears in an automobile. More specifically, the construction shown in FIG. 7 is different from the construction shown in FIG. 1 in a method of connecting gears of a planetary gear 4 on input and output sides. In FIG. 7, a gear 20 meshing with an input-side gear 19 is connected to a ring gear 4r in a planetary gear 4. Further, a gear 21 engaged with a planet gear 4p is connected to an output-side gear 5. Thus, the gears of the planetary gear 4 connected to input and output sides in FIG. 7 are reverse to those in FIG. 1. Since the gear ratio from the ring gear to the planet gear in the planetary gear is larger than 1.0, the gear ratio from the gear 15 to the gear 20 and that from the gear 21 to the gear 5 can be set smaller than in FIG. 1.

It has been described previously that in the embodiment shown in FIG. 1 the gear ratio L from the gear 15 to the gear 5 is set at a value several times larger than the gear ratio H from the gear 15 to the gear 7. If the same setting is made in the embodiment shown in FIG. 7, the gear ratios on input and output sides of the planetary gear 4 can be made closer to the gear ratios on input and output sides of the planetary gear 6. Consequently, the gears can be designed more easily and can be arranged in a compact form, thus permitting the realization of a transmission smaller in size.

FIG. 8 illustrates a further embodiment of the present invention which is different in how to construct gears from the embodiment shown in FIG. 7. This embodiment is characteristic in that a gear 15 is in mesh with a gear 17 and that the gear 17 is engaged with a planet gear 6p and also with a sun gear 4s in a planetary gear 4. It is a planet gear 4p in the planetary gear that is connected to a motor 8 through a clutch 14, with a ring gear 4r being connected to an output-side gear 5 through a gear 22 which is for reverse rotation. The gear ratio from the sun gear 4s in the planetary gear 4 to the planet gear 4p is usually several times larger than the gear ratio from the ring gear 4r to the planet gear 4p. Therefore, by connecting the gear 17 to the sun gear 4s it is possible to obtain a larger gear ratio than in the embodiments illustrated in FIGS. 1 and 7 and hence possible to omit the gears 16, 19 and 20 used in those previous embodiments. As a matter of course, the effect of reducing the motor size by setting the gear ratios on the input side of the two planetary gears in FIG. 1 at different values can also be obtained in the embodiment illustrated in FIG. 8. In the planetary gear 4, since the rotational direction of the sun gear 4s and that of the ring gear 4r rotated thereby are opposite to each other, the gear 22 is used to obtain a reverse rotation. As a result, upon operation of the engine 1, the rotation of the gear 5 and that of the gear 7 become coincident with each other within the usual speed range of each motor.

Thus, according to this embodiment it is possible to decrease the number of gears used and hence it is possible to realize a more compact transmission.

FIG. 9 illustrates an automobile using a still smaller number of gears according to a further embodiment of the present invention. Since a basic method for constructing planetary gears is the same as in the system of FIG. 7, a description will now be given while making comparison with FIG. 7. A rotating shaft of an engine 1 is connected to a planet gear 6p in a planetary gear 6 and causes a gear 21 to rotate via a gear 15. The gear 21 is engaged with a ring gear 4r in a planetary gear 4. This construction corresponds to the construction of FIG. 7 in which the gear ratio from the gear 15 to the gear 17 is set at 1.0. The gear ratio from the gear 15 to the gear 20 in FIG. 9 corresponds to the gear ratio from the gear 15 to the gear 20 in FIG. 7. Thus, equal characteristics can be obtained by making these set values coincident with each other.

In this embodiment, a ring gear 6r in the planetary gear 6 outputs a torque to a gear 7 via a gear 18 which is engaged with the ring gear 6r. The planetary gear 4 is connected to the same shaft as that of the gear 7 through a planet gear 4p. A driving torque is outputted from this shaft to tires 3a and 3b. Thus, also as to the output-side construction of the planetary gears, the construction shown in FIG. 9 can be made corresponding to the construction shown in FIG. 7. More specifically, the gear ratio from the gear 18 to the gear 7 in FIG. 9 corresponds to the gear ratio from the gear 18 to the gear 7 in FIG. 7, and if the gear ratio from the gear 21 to the gear 5 in FIG. 7 is set at 1.0, this construction is equal to that shown in FIG. 9.

In this way a similar performance to that in FIG. 7 can be attained by a system configuration with a smaller number of gears and thus this embodiment is characteristic in that a hydbrid automobile capable of attaining a speed changing function at low cost can be realized.

FIG. 10 shows another example of the clutch trouble processing method shown in FIG. 4, which is different from that shown in FIG. 6. This processing method is different from that of FIG. 6 in that step 130 is provided instead of steps 125 and 126 in FIG. 6. The processing of step 130 is performed when the clutch 14 is not properly released. In this case, a field weakening control is conducted for the motor 8. According to this field weakening control, a field magnet generated by the permanent magnet of the motor 8 as a permanent magnet synchronous motor is cancelled to some extent by the motor current. With this control, even if the motor 8 is rotated at a high speed, there is no fear that a counter electromotive force may become excessive, because of a substantial decrease of magnetic flux. Thus, even if the maximum vehicle speed is not limited, there is no fear of damage to the power converter 10, so that the driving performance in clutch failure can be improved.

Transmissions using two planetary gears controlled by motors and hybrid vehicles using the same, both embodying the present invention, have been described above. The present invention is also applicable to the case where three or more planetary gears are used, so that a still more steps of transmission can also be constituted. Although the motors referred to above are mainly synchronous motors using a permanent magnet, there may be used a DC motor using a permanent magnet as a field magnet. The present invention is further applicable to the case where a permanent magnet-free induction motor or synchronous motor is used. It goes without saying that a combination of the motors referred to above can also be used effectively. Although the control method described above mainly control the sun gear in each planetary gear with a motor, there may be adopted another method controlling another gear. Thus, the present invention can be practices using any of various combined methods. As to the differential mechanisms, planetary gears are used in the above embodiments, they may be substituted by commonly-used differential gears, or when importance is attached to quietness, there may be used harmonic gears. It is needless to say that the transmission according to the present invention is applicable not only to automobiles but also to ships and various other vehicles, including rolling stock and bicycles.

In the present invention, there are used a plurality of differential mechanisms in which motors control a difference in the number of revolutions between an input shaft and an output shaft thereof, the input and output shafts for the plural differential mechanisms being used in common, gear ratios from the input shafts to the output shafts in the plural differential mechanisms are set at a value different to each other, and gear ratios from the input shafts to the motors of the plural differential mechanisms are set at a value different to each other, whereby it is possible to provide a transmission having a small-sized motor of a low torque and a motor prevented from high revolution and having a stepless speed changing function which permits operation in a high engine efficiency region while minimizing an electrical energy loss.

According to the present invention, in another aspect thereof, there are used a plurality of differential mechanisms in which motor shafts driven by motors control a difference in the number of revolutions between an input shaft and an output shaft thereof, the input and output shafts for the plural differential mechanisms being used in common, gear ratios from the input shafts to the output shafts in the plural differential mechanisms are set at a value different to each other, and there is provided a locking/unlocking mechanism for locking and unlocking the motor shaft in a differential mechanism which is larger at least in its gear ratio, whereby there can be provideed a transmission having a small-sized motor of a low torque and a motor prevented from high revolution and having a stepless speed changing function which permits operation in a high engine efficiency region while minimizing an electrical energy loss.

According to the present invention, in a further aspect thereof, in a vehicle having an engine which generates a driving energy for driving the vehicle and a transmission which changes the rotational speed of the engine and transmits a driving force for wheels, the transmission is provided with at least first and second differential mechanisms which input a driving force generated by the engine and which output a driving force for the wheels, and is also provided with first and second motors for controlling the first and second differential mechanisms, respectively, wherein gear ratios from the input shafts to the output shafts in the first and second differential mechanisms are set at a value different to each other and gear ratios from the input shafts to the first and second motors are also set at a value different to each other. With this construction it is possible to provide a vehicle of a low cost and a reduced fuel consumption.

According to the present invention, in a still further aspect thereof, in a vehicle having an engine which generates a driving energy for driving the vehicle and a transmission which changes the rotational speed of the engine and transmits a driving force to wheels, the transmission is provided with at least first and second differential mechanisms which input a driving force generated by the engine and which output a driving force for the wheels, and is also provided with first and second motors for controlling the first and second differential mechanisms, respectively, wherein a gear ratio from the input shaft to the output shaft in the first differential mechanism is set at a value larger than a gear ratio from the input shaft to the output shaft in the second differential mechanism, and there is provided with a locking/unlocking mechanism for locking and unlocking a motor shaft which transmits the driving force of at least the first motor to the first differential mechanism. Also with this construction it is possible to provide a vehicle of a low cost and a reduced fuel consumption.

What is claimed is:

1. A transmission including a plurality of differential mechanisms in which motors control a difference in the number of revolutions between an input shaft and an output shaft thereof, said input shaft and said output shaft for said plural differential mechanisms being used in common, wherein gear ratios from said input shaft to said output shaft in said plural differential mechanisms are set at a value different to each other, and gear ratios from said input shaft to the motors in said plural differential mechanisms are set at a value different to each other.

2. A transmission including first and second planetary gears each comprising at least three components of a sun gear, a planet gear and a ring gear; first and second motors for respectively controlling the sun gears in said first and second planetary gears; input shafts connected to the planet gears in said first and second planetary gears respectively; and output shafts connected to the ring gears in said first and second planetary gears respectively; wherein gear ratios from said input shafts to said first and second motors are set at a value different to each other.

3. A transmission including first and second planetary gears each comprising at least three components of a sun gear, a planet gear and a ring gear; first and second motors for respectively controlling the sun gears in said first and second planetary gears; at least one of input shafts connected to at least one of the ring gears in said first and second planetary gears; and at least one of output shafts connected to at least one of the planet gears in said first and second planetary gears; wherein gear ratios from said input shafts to said first and second motors are set at a value different to each other.

4. A transmission including an input shaft which inputs a driving force; an output shaft which outputs a driving force; first and second planetary gears each comprising a sun gear, a planetary gear and a ring gear; and first and second motors for respectively controlling the sun gears in said first and second planetary gears; wherein the planet gear in said first planetary gear and the ring gear in said second planetary gear are connected to said input shaft, while the ring gear in said first planetary gear and the planet gear in said second planetary gear are connected to said output shaft.

5. A transmission including a plurality of differential mechanisms in which motor shafts are driven by motors to control a difference in the number of revolutions between an input shaft and an output shaft thereof, said input shaft and said output shaft for said plural differential mechanisms being used in common, wherein gear ratios from said input shaft to said output shaft in said plural differential mechanisms are set at a value different to each other, and there is further included a locking/unlocking mechanism for locking and unlocking the motor shaft in at least a differential mechanism of a larger gear ratio of said plural differential mechanisms.

6. A vehicle including an engine which generates a driving energy for driving the vehicle and a transmission which changes the rotational speed of said engine and transmits a driving force to wheels, said transmission including at least first and second differential mechanisms which input a driving force generated by said engine and which output a driving force for the wheels, and first and second motors for respectively controlling said first and second differential mechanisms, wherein gear ratios from input shafts to output shafts in said first and second differential mechanisms are set at a value different to each other, and gear ratios from said input shafts to said first and second motors are set at a value different to each other.

7. A vehicle including an engine which generates a driving energy for driving the vehicle and a transmission which changes the rotational speed of said engine and transmits a driving force to wheels, said transmission including at least first and second differential mechanisms which input a driving force generated by said engine and which output a driving force for the wheels, and first and second motors for respectively controlling said first and second differential mechanisms, wherein a gear ratio from an input shaft to an output shaft in said first differential mechanism is set at a value larger than a gear ratio from the input shaft to the output shaft in said second differential mechanism, and there is further included a locking/unlocking mechanism for locking and unlocking a motor shaft which transmits a driving force of at least said first motor to said first differential mechanism.

8. A vehicle according to claim 7, wherein said locking/unlocking mechanism is unlocked when the rotational speed of said motor shaft is at a predetermined value or more.

9. A vehicle according to claim 7, wherein said locking/unlocking mechanism is unlocked when said first motor stops generation of a torque.

10. A vehicle according to claim 7, wherein said locking/unlocking mechanism is locked after the rotational speed of the motor shaft in the locking/unlocking mechanism has been subjected to even speed control by said first motor.

11. A vehicle according to claim 7, further including a failure detecting means for detecting a failure of said locking/unlocking mechanism, and a speed limiting means which limits the speed of the vehicle or of the engine in accordance with a signal provided from said failure detecting means.

12. A vehicle according to claim 7, further including a failure detecting means for detecting a failure of said locking/unlocking mechanism, and a voltage suppressing means which suppresses a counter electromotive force of said first motor in accordance with a signal provided from said failure detecting means.

\* \* \* \* \*